United States Patent
Hoenicka et al.

(10) Patent No.: US 9,677,947 B2
(45) Date of Patent: Jun. 13, 2017

(54) TEMPERATURE SENSOR

(71) Applicant: MICRO-EPSILON Messtechnik GmbH & Co. KG, Ortenburg (DE)

(72) Inventors: Reinhold Hoenicka, Ortenburg (DE); Sabine Schmideder, Wurmannsquick (DE); Norbert Reindl, Fuerstenzell (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 315 days.

(21) Appl. No.: 13/679,218

(22) Filed: Nov. 16, 2012

(65) Prior Publication Data

US 2013/0128925 A1    May 23, 2013

(30) Foreign Application Priority Data

Nov. 17, 2011 (DE) .......................... 10 2011 086 600

(51) Int. Cl.
*G01K 1/00* (2006.01)
*G01K 1/08* (2006.01)

(52) U.S. Cl.
CPC ..................................... *G01K 1/08* (2013.01)

(58) Field of Classification Search
USPC .................................................. 374/208, 183
See application file for complete search history.

(56) References Cited

U.S. PATENT DOCUMENTS

| | | | |
|---|---|---|---|
| 3,580,744 A * | 5/1971 | Inouye et al. ................ 136/234 |
| 3,954,507 A * | 5/1976 | Carter ........................... 136/233 |
| 3,960,604 A * | 6/1976 | Heitzinger et al. ........... 136/233 |
| 5,660,473 A * | 8/1997 | Noma ....................... G01K 1/16 |
| | | | 374/145 |
| 5,709,822 A * | 1/1998 | Togashi ........................ 261/44.2 |
| 5,753,835 A * | 5/1998 | Gustin ................. G01D 11/245 |
| | | | 374/208 |
| 6,212,946 B1 * | 4/2001 | Naegele et al. ........... 73/114.31 |
| 6,380,840 B1 * | 4/2002 | Wienand ................ G01K 7/183 |
| | | | 338/25 |
| 6,639,505 B2 * | 10/2003 | Murata .................... G01K 7/22 |
| | | | 338/25 |
| 6,860,635 B2 * | 3/2005 | Muziol et al. ................ 374/185 |
| 8,197,134 B2 * | 6/2012 | Robinson ............... G01K 7/023 |
| | | | 374/148 |
| 2002/0125984 A1 * | 9/2002 | Muziol ..................... G01K 7/16 |
| | | | 338/28 |
| 2003/0081648 A1 | 5/2003 | Meier |

(Continued)

FOREIGN PATENT DOCUMENTS

CN        101750439 A        6/2010
CN        102116682 A        7/2011

(Continued)

OTHER PUBLICATIONS

Translation of DE 4439892 (May 9, 1996).*

(Continued)

*Primary Examiner* — Mirellys Jagan
(74) *Attorney, Agent, or Firm* — Alston & Bird LLP

(57) ABSTRACT

A temperature sensor comprising a sensor element that is arranged in a housing, is characterized in that the sensor element is totally enclosed with a thermally conductive material, preferably with a thermally conductive paste, inside the housing.

2 Claims, 5 Drawing Sheets

(56) References Cited

U.S. PATENT DOCUMENTS

| | | | |
|---|---|---|---|
| 2004/0095987 A1* | 5/2004 | Damaschke et al. | 374/185 |
| 2005/0117626 A1* | 6/2005 | Kobayashi et al. | 374/163 |
| 2005/0265426 A1* | 12/2005 | Hanzawa et al. | 374/208 |
| 2009/0067475 A1* | 3/2009 | Tavener | 374/208 |
| 2009/0141772 A1* | 6/2009 | Robinson | 374/179 |
| 2010/0054301 A1* | 3/2010 | Abe | G01K 1/08 374/148 |
| 2010/0180436 A1* | 7/2010 | Youtsey | H01R 43/22 29/751 |
| 2013/0075133 A1* | 3/2013 | Meilhamer | G01D 1/00 174/152 G |
| 2013/0077653 A1* | 3/2013 | Koshimizu et al. | 374/185 |
| 2016/0018268 A1* | 1/2016 | Mochizuki | G01K 1/12 374/163 |

FOREIGN PATENT DOCUMENTS

| | | |
|---|---|---|
| DE | 271374 A1 | 8/1989 |
| DE | 3838121 A1 | 5/1990 |
| DE | 4439892 A1 | 5/1996 |
| DE | 4424384 C2 | 4/1998 |
| DE | 10152619 A1 | 5/2003 |
| DE | 102008062551 B3 | 7/2010 |
| EP | 1610109 A1 | 12/2005 |

OTHER PUBLICATIONS

Translation of DE 102008062551 (Jul. 29, 2010).*
Translation of DE 10152619 (May 15, 2003).*
Translation of DE 4424384 (Apr. 9, 199).*
Translation of DE 3838121 (May 17, 1990).*

* cited by examiner

1

TEMPERATURE SENSOR

CROSS-REFERENCE TO RELATED APPLICATIONS

This application claims the benefit of German Patent Application Serial No. 10 2011 086 600.0, filed Nov. 17, 2011, the contents of which is hereby incorporated by reference in its entirety.

BACKGROUND OF THE INVENTION

The invention relates to a temperature sensor comprising a sensor element that is arranged in a housing.

There are a number of temperature sensors, based on a variety of different physical measurement principles, on the market for conducting a temperature measurement. Especially popular are electric temperature sensors, for example PTC sensors (positive temperature coefficient sensor) or NTC sensors (negative temperature coefficient sensor), or thermocouples, which have a very simple design and are inexpensive to produce. The actual sensor element can be an electric ohmic resistor, which changes with the temperature. Thermocouples consist of a contact point of two different metals, and this contact point generates a thermal stress when the temperature changes. In the simplest case sensors of this type are produced as a sensor pill with at least two connecting wires. The evaluation of the electric signal is usually performed in an electronic unit, in which the sensor element is a part of a bridge circuit.

For industrial applications it is often necessary to encapsulate the sensor element in a housing. Encapsulation is logical because it constitutes, on the one hand, a reasonable way to install and to make contact with the sensor element. On the other hand, the housing also has to constitute protection for the sensor element, in particular, in rough environments; that is, the sensor pill and the infeed lines are insulated from the environment.

The sensor elements are usually encapsulated in a housing in order to avoid environmental influences, corrosion, etc., for example, due to chemicals or also just due to moisture. Housings of commercially available sensors are made, depending on the application, of metal, ceramic, glass, plastic or other solid materials. Highly stable housings that are made of metal or ceramic are used, in particular, in situations of extremely challenging environmental conditions, and these housings encapsulate the sensor element. When the housing is used in aggressive media or in a high vacuum, it is mandatory that the housing be closed in such a way that it is hermetically tight. In particular, in the ultra high vacuum (UHV) it has to be guaranteed that the sensor will not outgas and contaminate the ultra high vacuum. In this case a hermetically sealed encapsulation is especially necessary.

Since the housing constitutes a thermal insulation of the sensor element against the measuring junction, the temperature that is to be measured is transmitted, delayed by the housing, to the sensor element. Therefore, the housings are made with walls that are as thin as possible, at least at the location of the sensor element, and the sensor element is brought into direct contact with the wall of the housing, in order to produce the best possible heat exchange between the housing and the sensor element. In addition, thermally conductive paste or similar substances exhibiting good heat conduction are often deposited in the housing, in order to improve the thermal contact.

For conventional measuring tasks, for example, in air conditioning technology, in the automobile or in industrial production environments, the accuracy that can be attained with sensors that are constructed in the manner described above is totally adequate.

However, for measuring tasks that require extremely high precision, the past construction technology of these temperature sensors has reached its limits. Since the goal is to achieve the best possible thermal contact with the housing and, in so doing, to thermally connect the sensor element directly to the housing, the result is that mechanical stresses are transferred to the sensor element. These mechanical stresses can be generated, for example, by compressive loads (positive or negative pressure) acting on the sensor. Another source of mechanical stress can be the temperature change itself. The high mechanical stresses can be generated by the different coefficients of thermal expansion of the materials that are used in the sensor. Moreover, even the coupling, for example, by adhesive cementing, or the clamping of the sensor to the object that is to be subjected to a temperature measurement can generate mechanical stress that acts on the sensor element.

If a mechanical stress acts on the sensor element, the result can be a change in the electric resistance and, thus, a change in the measurement signal. In the case of thermocouples any mechanical stress acting on the sensor element can also cause an electric voltage to be generated; and this electric voltage also affects the measurement signal.

The influence is usually in the ppm range and can be ignored in almost all applications. If, however, it is a question of resolving temperatures in the mK range or more specifically to measure reliably, then the mechanical stress results in errors that are larger than the required resolution or more specifically the required accuracy.

BRIEF SUMMARY

Therefore, it is necessary to provide a complete encapsulation of the sensor element, so that mechanical stresses are not exerted on the sensor element.

This engineering object is achieved in that the sensor element is totally enclosed with a thermally conductive material, in particular with a thermally conductive paste, in the housing. This strategy makes it possible to mechanically decouple the actual measuring element from the housing in such a way that a very good thermal coupling to the object to be measured continues to exist. In this context the thermally conductive paste has to establish, on the one hand, good thermal contact and, on the other hand, may not exert any mechanical stress. The thermally conductive paste has to exhibit an adequately low viscosity over the entire temperature range to be covered by the sensor. On the other hand, the viscosity has to be sufficiently high, so that the sensor element is positively covered with the thermally conductive paste in all mounting positions. In addition, it is advantageous, if the sensor element is hermetically encapsulated in the housing.

The sensor is hermetically encapsulated, so that the thermally conductive paste will not outgas. Outgas sing has to be prevented, especially under ultra clean environmental conditions, such as in the production of semiconductors or when applying a vacuum.

At this point there are a number of possibilities that lend themselves to designing and further developing the teaching of the present invention in an advantageous way. For this purpose reference is made, on the one hand, to the patent claims that follow patent claim 1 and, on the other hand, to the following elucidation of some preferred exemplary embodiments of the invention by means of the drawings. Moreover, embodiments and further developments of the teaching that are preferred in general are also explained in conjunction with the elucidation of the preferred exemplary embodiments of the invention by means of the drawings.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

Various embodiments now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
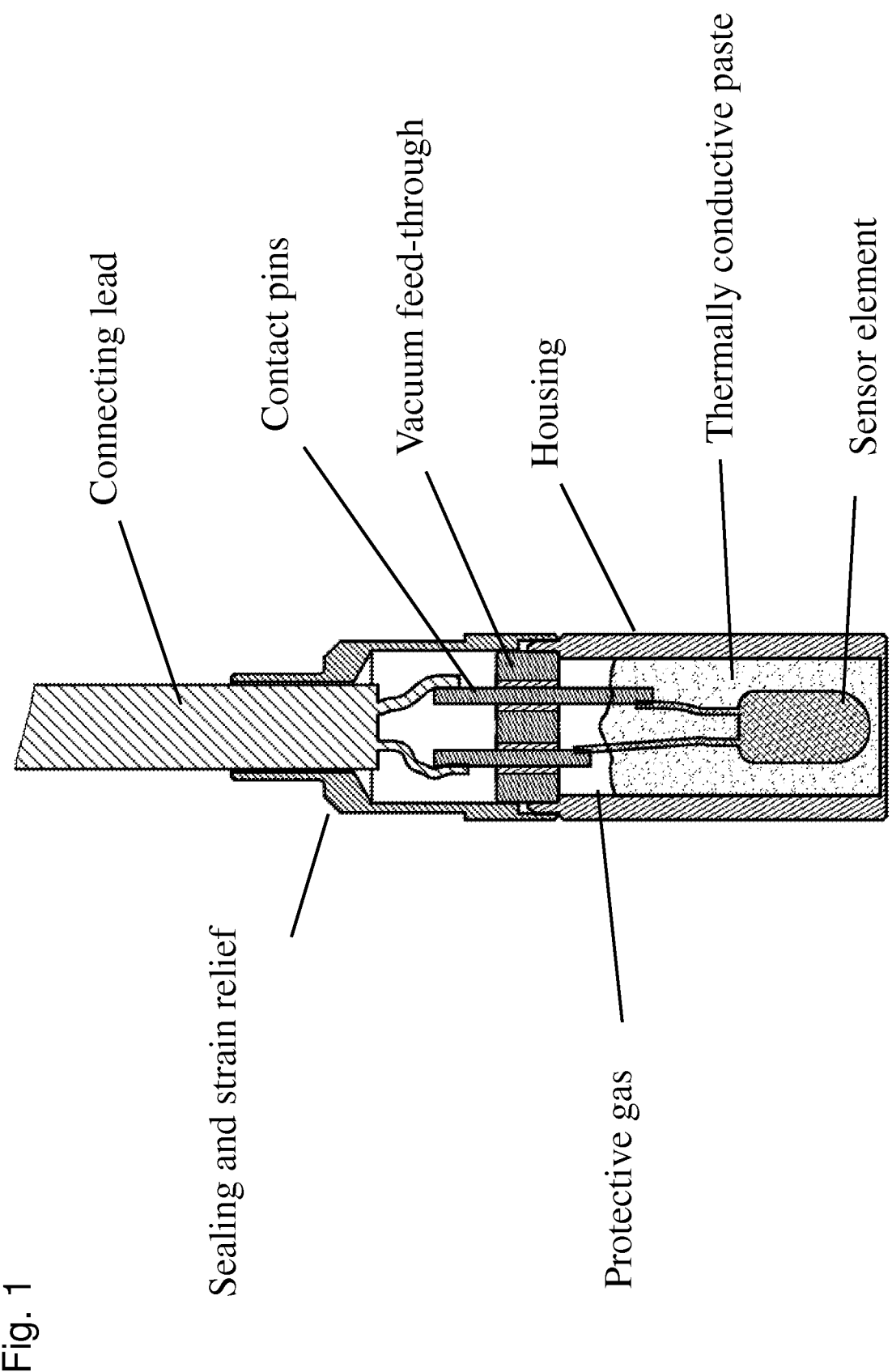
FIG. 1 is an illustration of a high precision thermistor having long term stability.

According to FIG. 1, a high precision thermistor having long term stability is soldered with its two connecting wires to two contacts of a glass bushing. Instead of a soldered joint, it is also possible to use other conventional joining technologies, such as welding, brazing or crimping. The housing of the sensor forms a sleeve that is open on one side and that has a thin face surface. The sleeve can be made of metal, ceramic or any other suitable, vacuum compatible materials. The thermally conductive paste is filled into the housing. Then the thermistor is inserted into the housing together with a glass bushing, so that the gap or free space between the thermistor and the housing is totally filled with the thermally conductive paste. This feature ensures a good thermal coupling of the thermistor to the sensor housing. At the same time the thermistor may not come into direct contact with the housing, but rather has to be totally enclosed with the thermally conductive paste. Owing to this "floating" mounting of the thermistor there are no mechanical stresses that could cause a change in the resistance of the thermistor and consequently an error in the temperature measurement.

The thermally conductive paste may not completely fill the sleeve, but rather a small free space must be left. If the thermally conductive paste were to completely fill the space, then it would be possible for mechanical or thermal stresses to be exerted again on the thermistor element, and these mechanical or thermal stresses could distort the measurement. The free space can be filled with a protective gas, for example, with nitrogen or argon, in order to prevent the contact points from corroding. However, the free space could also be evacuated, for example, by closing the sensor in a vacuum.

The hermetically sealed feed-through (for example, a glass bushing) is connected to the housing in a hermetically tight way. Suitable joining technologies include welding, but other possibilities are also conceivable, for example, adhesively cementing, soldering or crimping. The only feature that has to be ensured is that a hermetically tight seal is produced, so that it is ensured that the thermally conductive paste will not outgas and contaminate the ultra clean surroundings or the vacuum.

Contact is made with the strand of the connecting lead on the other side of the feed-through. In this case, too, preference is given to welding by laser beam on account of the outgassing. The housing is closed with a cover cap. This cap is crimped to the connecting lead, as a result of which a sealing and strain relief of the connecting lead are produced at the same time.

Then a temperature sensor that is designed in such a way can be applied on the measurement surface by a "rigid/solid" bonding without inducing mechanical stresses on the thermistor.

If an extremely high degree of accuracy is necessary in the course of measuring the temperature, then a single sensor element is often not enough. If just a single sensor element is used in the form of a quarter bridge, then the sensitivity is reduced, and interferences on the sensor element cannot be eliminated. Therefore, a half bridge arrangement of the sensor elements is preferred when high precision is required.

Figure 2A:
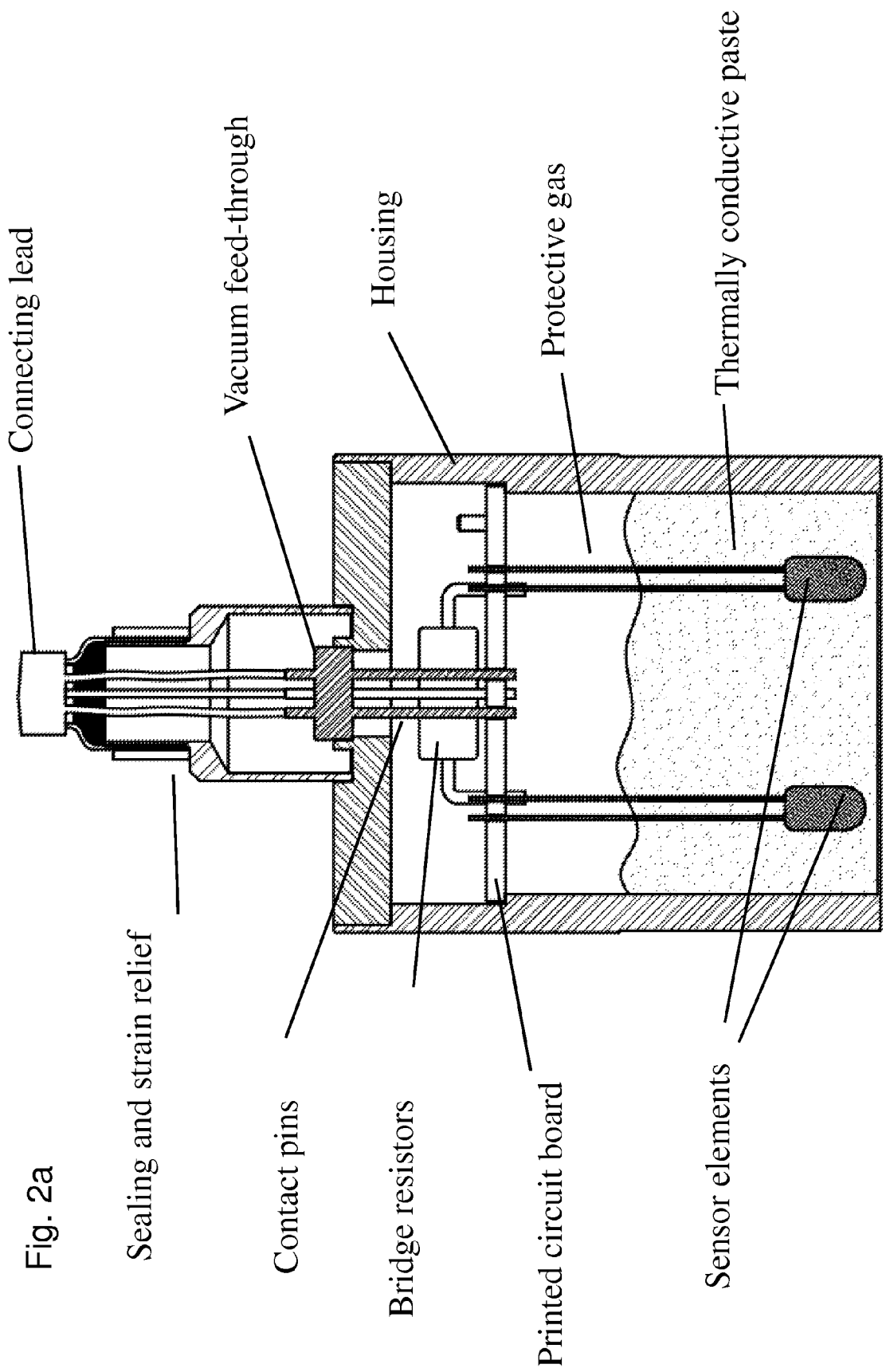
FIG. 2a is an illustration of two high precision thermistors with long term stability inserted into a common housing.

According to FIG. 2, two high precision thermistors with long term stability are inserted into a common housing. Both sensor elements shall be placed as close as possible next to each other, so that the temperature is measured at almost the same point (FIG. 2a). The two sensor elements are connected in connection with two reference resistors, which also exhibit high precision, temperature stability and long term stability, to form a measuring bridge.

Figure 2B:
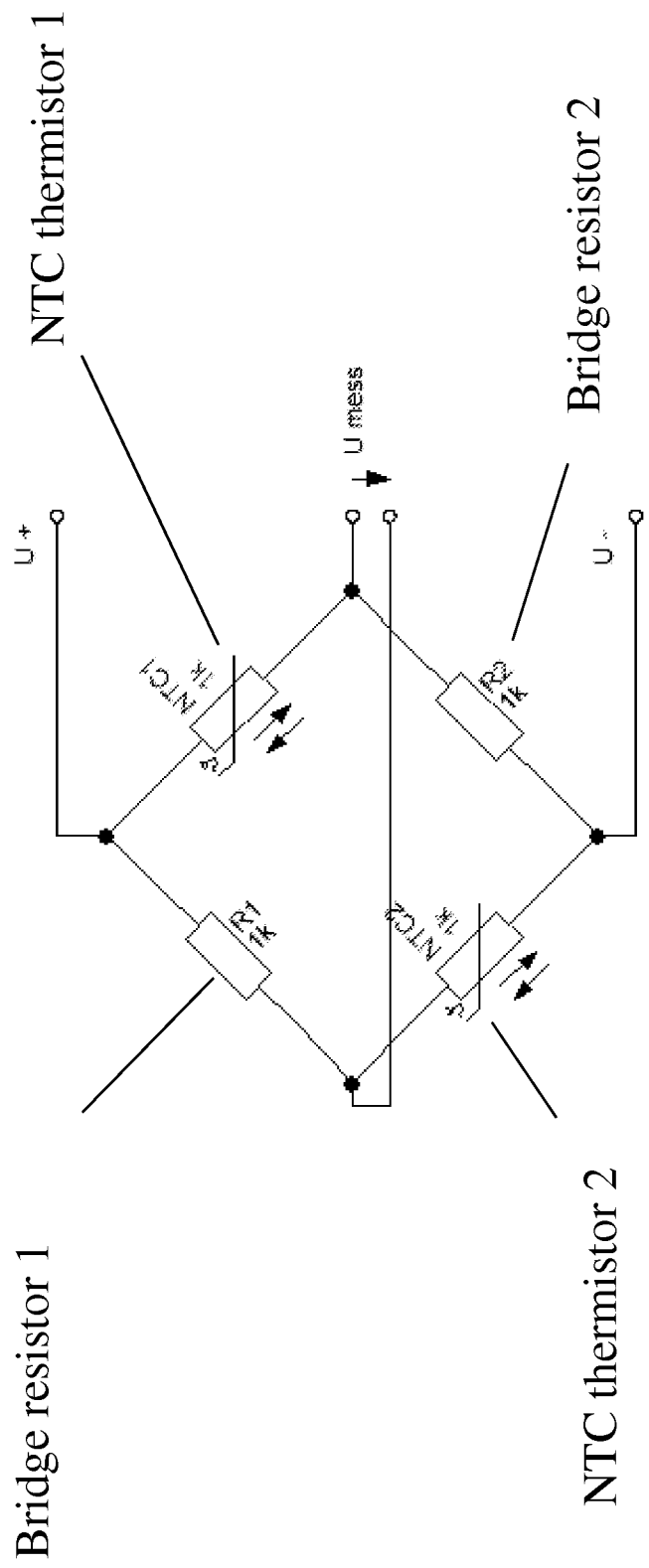
FIG. 2b is an illustration of a bridge circuit in which the thermistors of FIG. 2a are arranged.

The fact that the thermistors and the reference resistors are connected together, for example, to form a Wheatstone measuring bridge, which is known in measurement technology, makes it possible to significantly increase the sensitivity, if the thermistors are arranged diametrically in the bridge circuit (FIG. 2b).

Figure 3A:
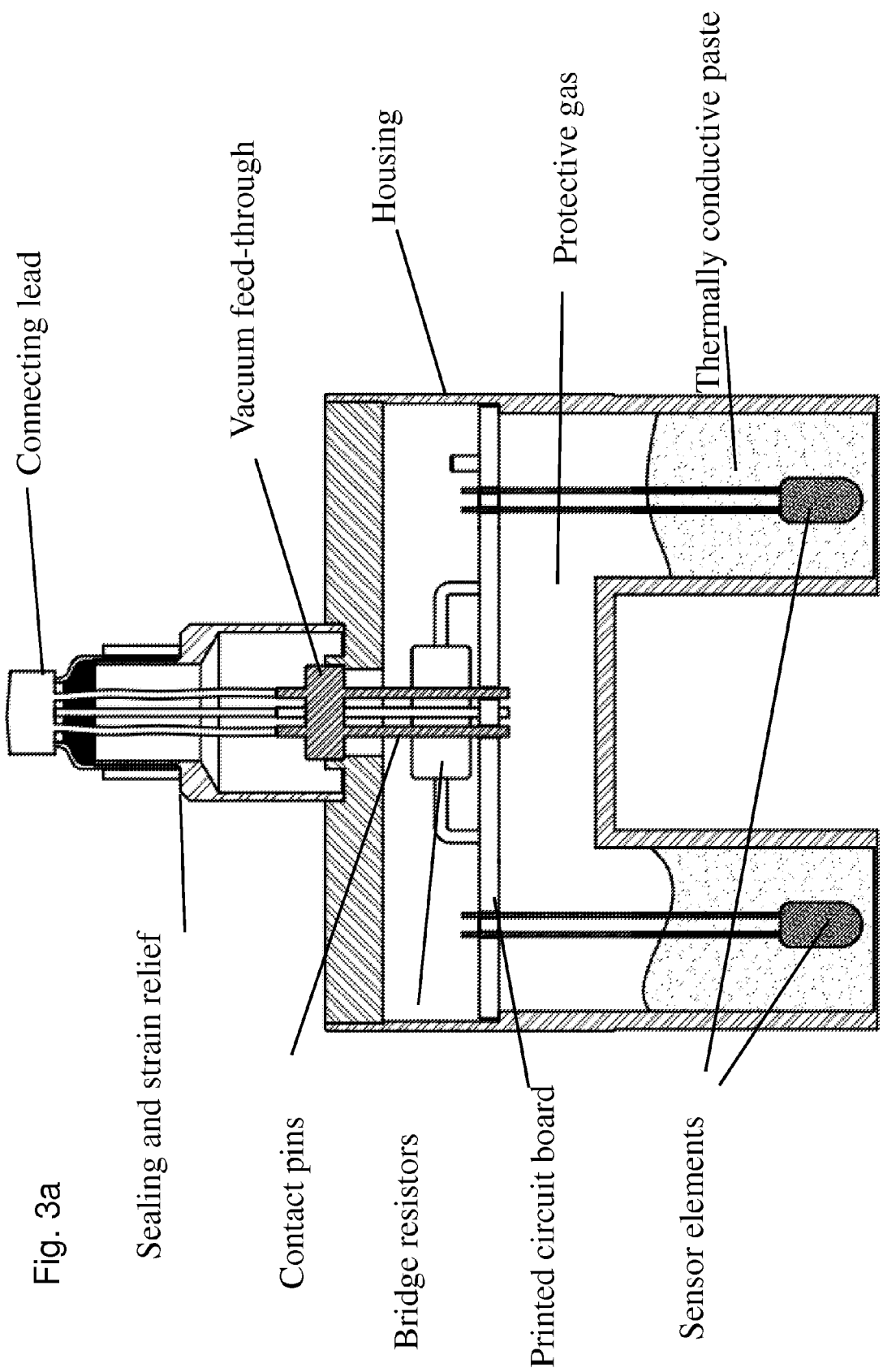
FIG. 3a is an illustration of two high precision thermistors thermally decoupled from each other.
Figure 3B:
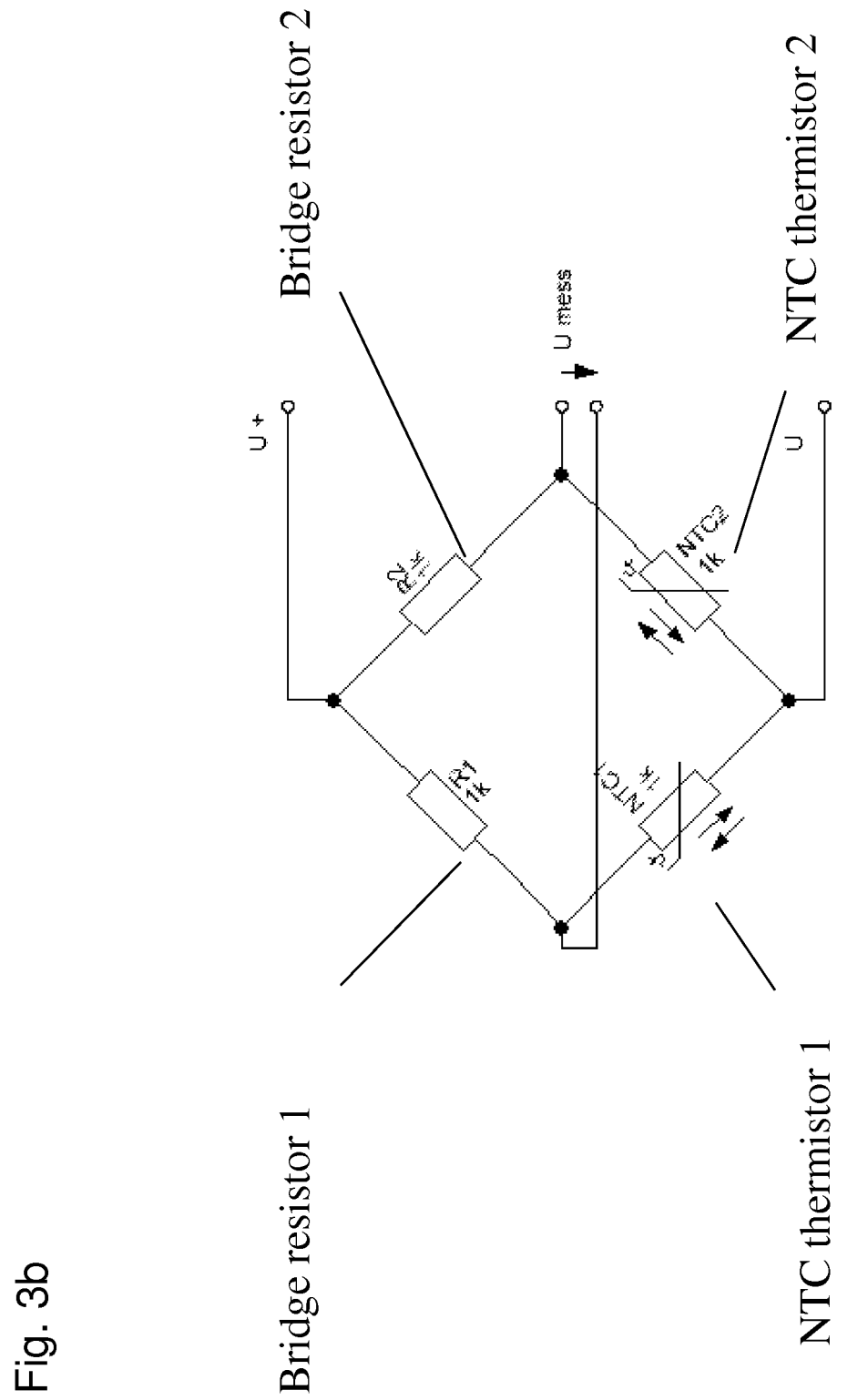
FIG. 3b is an illustration of a bridge circuit in which the thermistors of FIG. 3a are arranged.

According to FIG. 3, the two sensors are thermally decoupled from each other. Hence, the temperature differential between the two thermistors can also be measured very well (FIG. 3a). In this case the two thermistors are arranged in parallel (FIG. 3b).

It is especially advantageous if the reference resistors of the measuring bridge are also arranged in the housing. This arrangement allows the interference or other influences, such as the temperature, to act on all of the branches of the measuring bridge; and, as a result, these influences largely cancel each other out. The entire measuring bridge is deposited in a housing that is welded hermetically tight.

The measuring bridge can be connected directly to the contacts of the feed-through. For example, the measuring bridge can be arranged on a printed circuit board or on a ceramic substrate, and the thermistors are attached to the underside of the printed circuit board. This strategy is especially advantageous for the fabrication of the sensor, because it produces a unit that is easy to handle and that can be easily inserted into the housing. This unit consists of a glass bushing, the printed circuit board with the measuring bridge and the reference resistors as well as the thermistors. During assembly it is possible to ensure by means of a suitable design that a gap is produced between the thermistors and the face surface of the housing. The gap or free space between the thermistors and the housing is filled with a thermally conductive paste. This feature guarantees a good thermal coupling of the thermistors to the sensor housing. Owing to this "floating" mounting of the thermistor elements there are no mechanical stresses that could cause a change in the resistance of the thermistors and, as a result, an error in the temperature measurement.

A hermetically sealed feed-through (for example, a glass bushing), which is welded to the housing, ensures that the thermally conductive paste will not outgas and consequently contaminate the ultra clean environment or the vacuum. Then contact can be made with the cable on the other side of the feed-through. This cable is preferably welded, in order to prevent in turn an outgas sing.

Non-limiting exemplary advantages of the temperature sensor according to the invention:
hermetically sealed design, thereby use also in an ultra high vacuum
extremely high resolution in the millikelvin range
ease of assembly
compact type of design With respect to other advantageous embodiments of the device according to the invention, reference is made to the general part of the specification as well as to the appended patent claims, in order to avoid repetition.

In summary it is explicitly to be noted that the above-described exemplary embodiments of the device according to the invention serve only to elucidate the claimed teaching, but this teaching is not restricted to the exemplary embodiments. In particular, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A temperature sensor comprising:
    a sensor element that is arranged in a housing, wherein:
        the sensor element is totally enclosed with a thermally conductive material that fills a space inside the housing;
        the sensor element is hermetically encapsulated;
        the housing comprises a free space to prevent inducing mechanical stresses on the sensor element, the free space being formed such that in all mounting positions the sensor element is positively covered with the thermally conductive material, and wherein the space filled by the thermally conductive material is significantly greater than said free space;
        the housing comprises a vacuum feed-through; and
        contact pins are arranged in the vacuum feed-through for electrically connecting the sensor element.

2. A temperature sensor according to claim 1, wherein the housing comprises:
    two or more of the sensor elements;
    a printed circuit board with electronic components; and
    an electric connection between the two or more of the sensor elements and the printed circuit board,
    wherein the contact pins extend through the vacuum feed-through to at least one of a connecting piece or a connecting lead.

* * * * *